United States Patent
Zhang

(10) Patent No.: US 9,521,206 B2
(45) Date of Patent: Dec. 13, 2016

(54) METHOD, EQUIPMENT AND SYSTEM FOR PUSHING NETWORK CONTENT

(71) Applicant: Huawei Technologies Co., Ltd., Shenzhen (CN)

(72) Inventor: Fengming Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 146 days.

(21) Appl. No.: 14/482,216

(22) Filed: Sep. 10, 2014

(65) Prior Publication Data

US 2015/0020182 A1 Jan. 15, 2015

Related U.S. Application Data

(63) Continuation of application No. PCT/CN2013/072508, filed on Mar. 13, 2013.

(30) Foreign Application Priority Data

Mar. 13, 2012 (CN) .......................... 2012 1 0064801

(51) Int. Cl.
*G06F 7/04* (2006.01)
*H04L 29/08* (2006.01)
(Continued)

(52) U.S. Cl.
CPC .......... *H04L 67/26* (2013.01); *H04L 63/0281* (2013.01); *H04L 63/08* (2013.01); *H04L 67/34* (2013.01);
(Continued)

(58) Field of Classification Search
CPC ............ H04L 67/26; H04L 63/08; H04W 8/18
See application file for complete search history.

(56) References Cited

U.S. PATENT DOCUMENTS

2002/0026482 A1* 2/2002 Morishige ............... H04W 4/02
709/206
2002/0123335 A1* 9/2002 Luna ....................... H04L 29/06
455/419
(Continued)

FOREIGN PATENT DOCUMENTS

CN 101330526 A 12/2008
CN 101378408 A 3/2009
(Continued)

OTHER PUBLICATIONS

Foreign Communication From a Counterpart Application, European Application No. 13762025.8, Extended European Search Report dated Dec. 9, 2014, 7 pages.
(Continued)

*Primary Examiner* — Farid Homayounmehr
*Assistant Examiner* — Suman Debnath
(74) *Attorney, Agent, or Firm* — Conley Rose, P.C.

(57) ABSTRACT

A method, an equipment, and a system for pushing network content are provided that relate to the field of communications technologies. The method for pushing network content includes: setting, by a user, selected network content as a feature of a mobile equipment according to the interest point of the user on a network portal, and pushing an identifier of the network content and setting information to the mobile equipment, so the mobile equipment obtains the corresponding network content according to the identifier of the network content, and sets the network content as an attribute of the mobile equipment according to the setting information. With the present invention, the mobile equipment automatically sets the attribute of the mobile equipment according to the received identifier of network content and setting information pushed by a network side, thereby reducing operations of the user, and improving the user experience.

10 Claims, 6 Drawing Sheets

(51) Int. Cl.
*H04L 29/06* (2006.01)
*H04W 8/18* (2009.01)
*H04W 12/06* (2009.01)
*H04W 8/24* (2009.01)
*H04W 88/02* (2009.01)

(52) U.S. Cl.
CPC ............... *H04W 8/18* (2013.01); *H04W 12/06* (2013.01); *H04L 67/04* (2013.01); *H04L 67/30* (2013.01); *H04W 8/245* (2013.01); *H04W 88/02* (2013.01)

(56) References Cited

U.S. PATENT DOCUMENTS

| | | | |
|---|---|---|---|
| 2007/0100963 A1 | 5/2007 | Ban et al. | |
| 2007/0197196 A1* | 8/2007 | Shenfield | H04L 67/26 455/412.2 |
| 2011/0099487 A1 | 4/2011 | Pyhalammi et al. | |
| 2011/0138483 A1* | 6/2011 | Bravo | G06F 21/35 726/29 |
| 2011/0265159 A1* | 10/2011 | Ronda | H04L 63/0853 726/6 |
| 2012/0278854 A1* | 11/2012 | Ton | H04L 63/0815 726/3 |
| 2014/0052859 A1* | 2/2014 | Kruglick | H04L 41/00 709/225 |

FOREIGN PATENT DOCUMENTS

| | | |
|---|---|---|
| CN | 101754184 A | 6/2010 |
| CN | 102594908 A | 7/2012 |
| EP | 1318452 A1 | 6/2003 |

OTHER PUBLICATIONS

Partial English Translation and Abstract of Chinese Patent Application No. CN101754184A, Sep. 11, 2014, 28 pages.
Partial English Translation and Abstract of Chinese Patent Application No. CN102594908A, Sep. 11, 2014, 9 pages.
Foreign Communication From a Counterpart Application, Chinese Application No. 201210064801.5, Chinese Office Action dated Jan. 13, 2014, 5 pages.
Foreign Communication From a Counterpart Application, PCT Application No. PCT/CN2013/072508, English Translation of International Search Report dated Jun. 27, 2013, 2 pages.
Foreign Communication From a Counterpart Application, PCT Application No. PCT/CN2013/072508, English Translation of Written Opinion dated Jun. 27, 2013, 8 pages.

* cited by examiner

METHOD, EQUIPMENT AND SYSTEM FOR PUSHING NETWORK CONTENT

CROSS-REFERENCE TO RELATED APPLICATIONS

This application is a continuation of International Application No. PCT/CN2013/072508, filed on Mar. 13, 2013, which claims priority to Chinese Patent Application No. 201210064801.5, filed on Mar. 13, 2012, all of which are incorporated herein by reference in its entirety.

TECHNICAL FIELD

The present invention relates to the field of communications technologies, and in particular, to a method, an equipment and a system for pushing network content.

BACKGROUND

With rapid development of networks, more and more people search a network for interesting content, transfer the network content, save the network content in a mobile terminal of a user, and set the network content as a mobile terminal feature according to the interest of the user in a manual setting manner, for example, may set the network content as a mobile terminal feature such as a desktop, a wallpaper or a ring tone of the mobile terminal.

In the prior art, there are mainly two methods about how to push network content to a mobile terminal and set a mobile terminal feature. One method is a user browses interesting content on a website through a computer connected to a network, downloads the network content to the computer, then connects a mobile terminal to the computer through a data line, transfers the downloaded network content to the mobile terminal, and sets the network content as a mobile terminal feature according to the interest of the user in a manual setting manner.

The other method is if a mobile terminal has an Internet surfing function, a user may directly browse interesting content by surfing the Internet through the mobile terminal, downloads the network content to the mobile terminal, and sets the network content as a mobile terminal feature according to the interest of the user in a manual setting manner.

By use of the two methods, once the user carries no data line or the mobile terminal is not at hand, the network content cannot be transferred to the mobile terminal, and meanwhile, the manner of manually setting the mobile terminal feature also increases operations of the user on the mobile terminal, and influences the user experience.

SUMMARY

Embodiments of the present invention provide a method, an equipment and a system for pushing network content, so that a mobile equipment can set an attribute of the mobile equipment according to an identifier of network content and setting information which are received.

An embodiment of the present invention provides a method for pushing network content, including: receiving, by an interface server, a query request sent by a network portal, where the query request includes a user identifier and an authentication identifier; obtaining, by the interface server, one or more corresponding mobile equipment identifiers according to the user identifier after verification on the authentication identifier is passed; sending, by the interface server, the one or more mobile equipment identifiers to the network portal, so that the network portal obtains a mobile equipment identifier selected according to the one or more mobile equipment identifiers by a user; receiving, by the interface server, equipment execution information sent by the network portal, where the equipment execution information includes an identifier of network content, the selected mobile equipment identifier and setting information; and sending, by the interface server, the equipment execution information to a pushing proxy server, so that the pushing proxy server pushes the identifier of the network content and the setting information to a mobile equipment corresponding to the selected mobile equipment identifier, and the mobile equipment sets an attribute of the mobile equipment according to the identifier of the network content and the setting information.

Another embodiment of the present invention provides a method for pushing network content, including: receiving, by a mobile equipment, pushing information sent by a pushing proxy server, where the pushing information includes an identifier of network content and setting information; obtaining, by the mobile equipment, corresponding network content according to the identifier of the network content; and setting, by the mobile equipment, the network content as an attribute of the mobile equipment according to the setting information.

Another embodiment of the present invention provides an interface server, including: a receiving unit configured to receive a query request sent by a network portal, where the query request includes a user identifier and an authentication identifier; an obtaining unit configured to obtain one or more corresponding mobile equipment identifiers according to the user identifier after verification on the authentication identifier is passed; a sending unit configured to send the one or more mobile equipment identifiers to the network portal, so that the network portal obtains a mobile equipment identifier selected according to the one or more mobile equipment identifiers by a user, where the receiving unit is further configured to receive equipment execution information sent by the network portal, where the equipment execution information includes an identifier of network content, the selected mobile equipment identifier and setting information; and the sending unit is further configured to send the equipment execution information to a pushing proxy server, so that the pushing proxy server pushes the identifier of the network content and the setting information to a mobile equipment corresponding to the selected mobile equipment identifier, and the mobile equipment sets an attribute of the mobile equipment according to the identifier of the network content and the setting information.

Another embodiment of the present invention provides mobile equipment, including: a pushing information receiving unit configured to receive pushing information sent by a pushing proxy server, where the pushing information includes an identifier of network content and setting information; a network content obtaining unit configured to obtain corresponding network content according to the identifier of the network content; and a setting unit configured to set the network content as an attribute of the mobile equipment according to the setting information.

Another embodiment of the present invention provides a system for pushing network content, including the mobile equipment provided by the embodiment of the present invention, the interface server provided by the embodiment of the present invention and a pushing proxy server, where the pushing proxy server is configured to push an identifier of network content and setting information to the mobile equipment, so that the mobile equipment sets an attribute of the mobile equipment according to the identifier of the network content and the setting information.

It can be seen from the above technical solutions provided by the embodiments of the present invention that the user sets network content selected by the user as an attribute of the mobile equipment according to the interest point of the user on the network portal, and pushes the network content identifier and the setting information of the network content to the mobile equipment, so that the mobile equipment obtains corresponding network content according to the network content identifier, and sets the network content as an attribute of the mobile equipment according to the setting information. In this way, even if the user carries no data line or the mobile equipment is not at hand, the user can still push the network content to the mobile equipment conveniently, and the mobile equipment automatically sets the network content as an attribute of the mobile equipment according to the received setting information, thereby reducing manual setting operations of the user, and improving the user experience.

BRIEF DESCRIPTION OF THE DRAWINGS

To describe the technical solutions in the embodiments of the present invention or in the prior art more clearly, the following briefly introduces the accompanying drawings required for describing the embodiments or the prior art. The accompanying drawings in the following description show merely some embodiments of the present invention, and persons of ordinary skill in the art may still derive other drawings from the accompanying drawings without creative efforts.

DETAILED DESCRIPTION

The following clearly and completely describes the technical solutions in the embodiments of the present invention with reference to the accompanying drawings in the embodiments of the present invention. The described embodiments are merely a part rather than all of the embodiments of the present invention. All other embodiments obtained by persons of ordinary skill in the art based on the embodiments of the present invention without creative efforts shall fall within the protection scope of the present invention.

Figure 1:
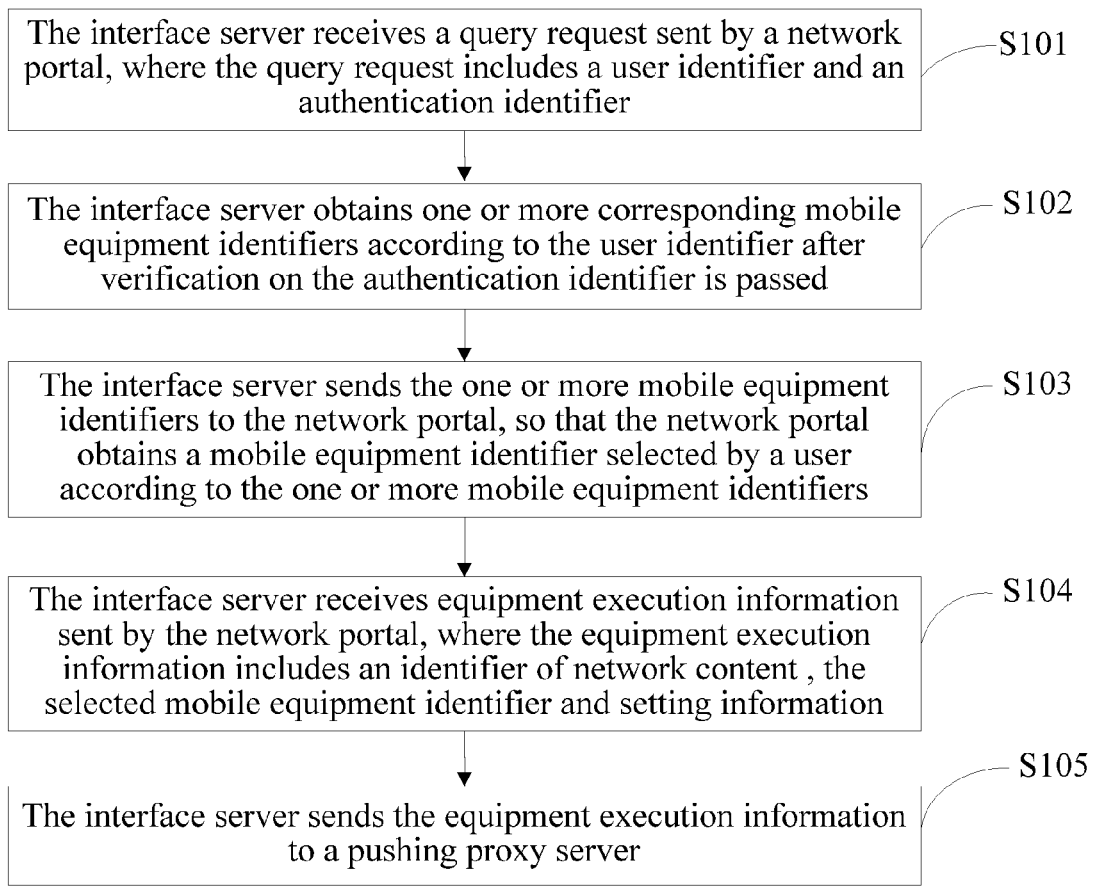
FIG. 1 is a schematic diagram of a method for pushing network content provided by an embodiment of the present invention.

FIG. 1 describes a method for pushing network content provided by an embodiment of the present invention, the execution subject of the embodiment is an interface server, and the method includes the following steps.

S101: The interface server receives a query request sent by a network portal, where the query request includes a user identifier and an authentication identifier.

The authentication identifier is used to request calling the interface server, and the interface server provides an interface used to execute data transmission, and exchanges data with the network portal through the interface. For example, the authentication identifier may be an interface token.

S102. The interface server obtains one or more corresponding mobile equipment identifiers according to the user identifier after verification on the authentication identifier is passed.

The interface server performs verification on the authentication identifier so as to determine the interface of the interface server called by the network portal, and determine that the interface is used to execute data transmission.

A user identifier may bind a plurality of mobile equipments, so there may be a plurality of mobile equipment identifiers obtained according to the user identifier, where a mobile equipment identifier may be the identifier of a mobile equipment, the name of the mobile equipment, or the like.

S103: The interface server sends the one or more mobile equipment identifiers to the network portal, so that the network portal obtains a mobile equipment identifier selected by a user according to the one or more mobile equipment identifiers.

Specifically, the user selects a mobile equipment identifier according to one or more mobile equipment identifiers displayed by the network portal, and the selected mobile equipment identifier is the identifier of a mobile equipment to which the user requests pushing network content.

S104: The interface server receives equipment execution information sent by the network portal, where the equipment execution information includes an identifier of network content, the selected mobile equipment identifier and setting information.

The identifier of the network content may specifically be a uniform resource locator (URL) of the network content selected by the user on the network portal.

The setting information refers to execution information for setting the attribute of the mobile equipment, wherein the attribute of the mobile equipment includes a wallpaper, a desktop or a ring tone, the corresponding setting information includes setting the wallpaper, the desktop or the ring tone of the mobile equipment. The setting information is execution information set by the user for the selected network content after the user selects the network content on the network portal according to the interest point of the user.

In another embodiment of the present invention, before the interface server receives the equipment execution information sent by the network portal, the interface server further obtains equipment configuration information corresponding to the one or more mobile equipment identifiers. Specifically, after obtaining the one or more mobile equipment identifiers, the interface server obtains the equipment configuration information corresponding to the one or more mobile equipment identifiers by querying an equipment information storage server.

Moreover, the interface server sends the equipment configuration information to the network portal, so that after the user selects the network content and the mobile equipment identifier, the network portal determines an appropriate identifier of the network content according to configuration information of the selected mobile equipment identifier, and then delivers the identifier of the network content to the mobile equipment selected. The equipment configuration information may be information such as the size or resolution of the screen of the mobile equipment or the multimedia supporting capability of the mobile equipment. For example, according to the configuration information of the resolution of the mobile equipment selected by the user, the network portal delivers a network content identifier suitable for the resolution to the selected mobile equipment, and an optimal display effect may be achieved.

S105: The interface server sends the equipment execution information to a pushing proxy server.

The pushing proxy server pushes the identifier of the network content and the setting information to the mobile equipment corresponding to the selected mobile equipment identifier according to the identifier of the network content, equipment information and the selected mobile equipment identifier in the setting execution information, so that the mobile equipment sets the attribute of the mobile equipment according to the identifier of the network content and the setting information. The pushing proxy server is configured to push the information in the interface server to the mobile equipment.

Specifically, that the mobile equipment sets the attribute of the mobile equipment according to the identifier of the network content and the setting information includes that the mobile equipment obtains the network content from a network server according to the identifier of the network content such as a download URL, and sets the attribute of the mobile equipment according to the setting information.

By adopting the method provided by the embodiment, the pushing proxy server pushes the identifier of the network content and the setting information to the mobile equipment, and in this way, even if the user carries no data line or the mobile equipment is not at hand, the user can still push the network content to the mobile equipment conveniently; in addition, the mobile equipment automatically sets the network content as the attribute of the mobile equipment according to the received setting information, thereby reducing manual setting operations of the user, and improving the user experience.

Figure 2:
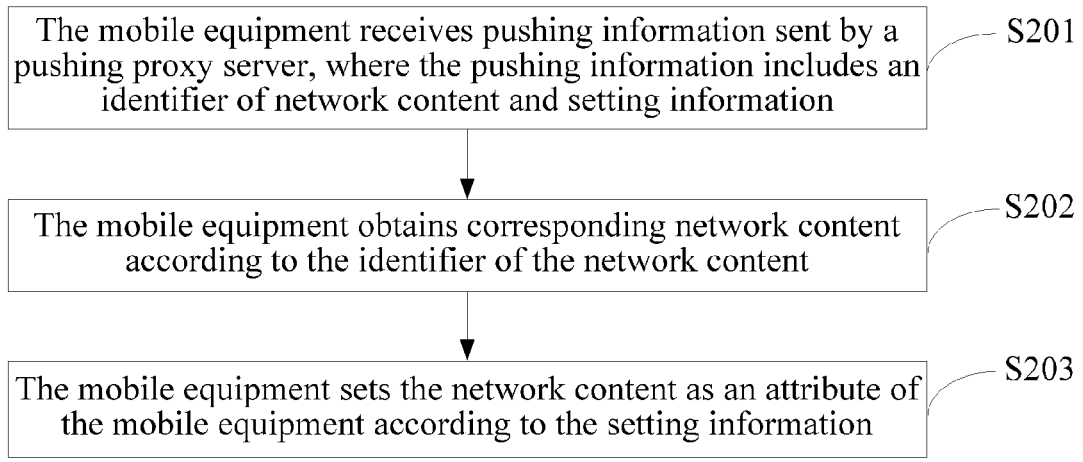
FIG. 2 is a schematic diagram of another method for pushing network content provided by an embodiment of the present invention.

FIG. 2 describes a method for pushing network content provided by an embodiment of the present invention, and the execution subject of the embodiment is a mobile equipment; in the embodiment of the present invention, the mobile equipment may be an equipment such as a mobile phone or a tablet computer, and the method includes the following steps.

S201: The mobile equipment receives pushing information sent by a pushing proxy server, where the pushing information includes an identifier of network content and setting information.

The identifier of the network content may be a URL of the network content; the setting information refers to execution information for setting the attribute of the mobile equipment, where if the attribute of the mobile equipment includes a wallpaper, a desktop or a ring tone, the corresponding setting information includes setting the wallpaper, the desktop or the ring tone of the mobile equipment. The setting information is execution information set by the user for the selected network content after the user selects the network content on the network portal according to the interest point of the user.

S202: The mobile equipment obtains corresponding network content according to the identifier of the network content.

Exemplarily, the mobile equipment downloads the network content from a network server corresponding to the network portal according to the URL of the network content.

S203: The mobile equipment sets the network content as an attribute of the mobile equipment according to the setting information.

Specifically, the mobile equipment sets the network content as the attribute of the mobile equipment according to the received setting information after obtaining the network content. When the mobile equipment is in the setting procedure, the user is not required to execute a setting command, and the mobile equipment automatically completes a setting task according to the setting information. For example, the mobile equipment automatically sets the wallpaper (namely, network content) obtained from the network as the wallpaper of the mobile equipment according to the received setting information for setting the wallpaper, and the user is not required to perform any operation in the entire setting procedure.

By adopting the method provided by the embodiment, the pushing proxy server pushes the identifier of the network content and the setting information to the mobile equipment, and in this way, even if the user carries no data line or the mobile equipment is not at hand, the user can still push the network content to the mobile equipment conveniently; in addition, the mobile equipment automatically sets the network content as the attribute of the mobile equipment according to the received setting information, thereby reducing manual setting operations of the user, and improving the user experience.

Figure 3:
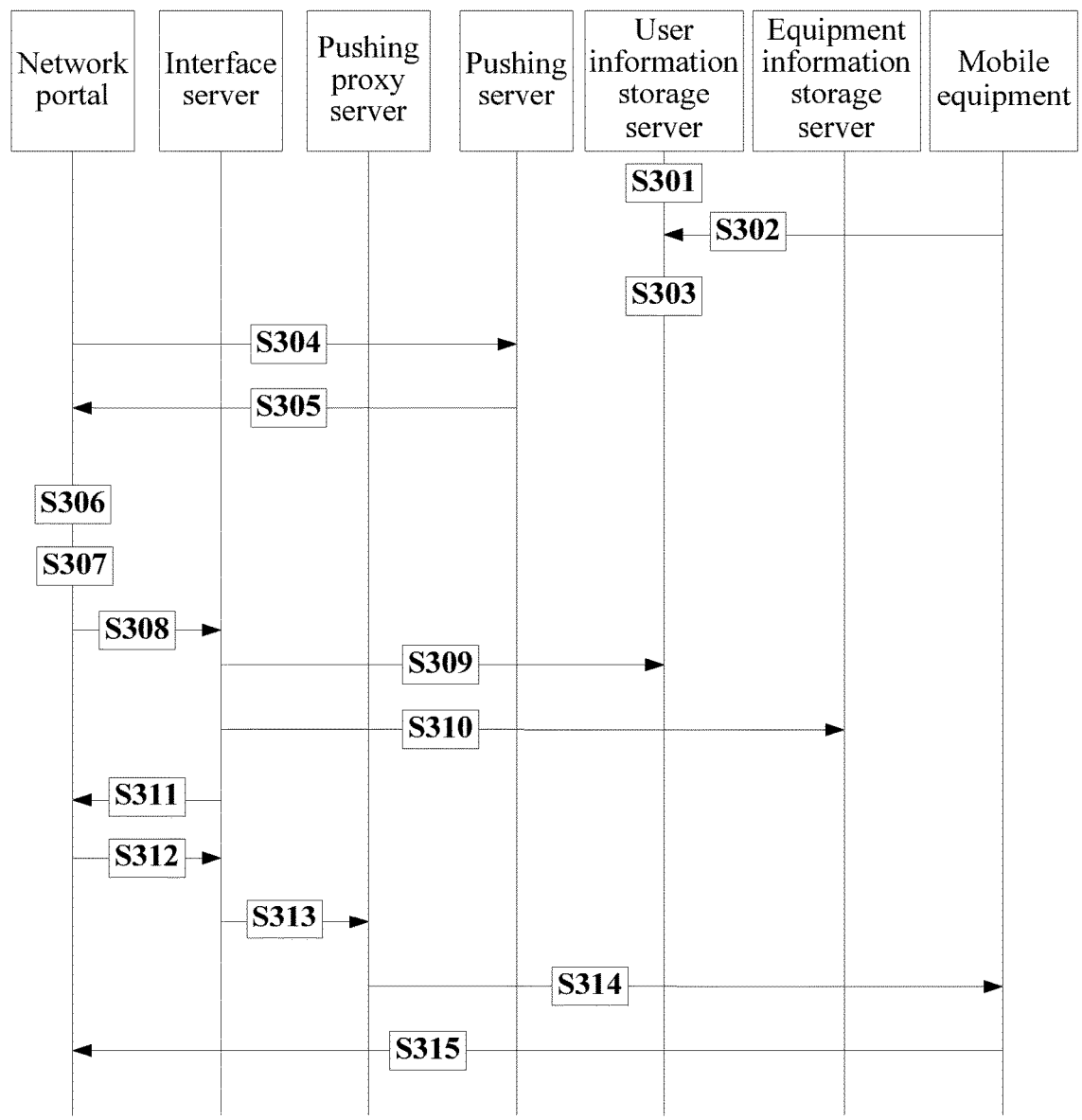
FIG. 3 is a schematic signaling flow chart of a method for pushing network content provided by an embodiment of the present invention.

FIG. 3 describes a signaling flow chart of pushing network content provided by an embodiment of the present invention, including the following steps.

S301: A user information storage server saves a user identifier registered successfully by a user through a pushing server.

Alternatively, the user may perform registration through a pushing client on a mobile equipment.

S302: The user information storage server receives a login request sent by a to-be-registered mobile equipment.

The login request carries the user identifier and the identifier of the to-be-registered the mobile equipment. Exemplarily, the identifier of the mobile equipment may be an international mobile equipment identity (IMEI) or a mobile equipment identifier (MEID), and the embodiment of the present invention is not limited thereto.

S303: The user information storage server searches for a user identifier, which is consistent with the user identifier in the login request, from user identifiers saved by the user information storage server, and if the user information storage server finds the user identifier successfully, the user information storage server saves a binding relationship between the user identifier and the identifier of the to-be-registered mobile equipment.

It should be noted that, if the network portal learns the network content selected by the user and confirms that the user successfully logs in to the pushing server through the user identifier, step S307 to step S315 are performed.

If the network portal confirms that the user does not successfully log in to the pushing server, step S304 to step S315 are performed.

S304: The user browses the network portal, and when the network portal determines that the user does not log in, redirect to the login page of the pushing server.

Specifically, when the user selects the network content according to the interest point of the user and selects information set by the mobile equipment for the network content, the network portal determines that the user does not log in.

First redirection request information sent by the network portal to the pushing server carries a network portal callback URL, so that the user can return to the network portal according to the URL after logging in successfully.

S305: After the user successfully logs in on the login page of the pushing server, redirect to the page corresponding to the network portal callback URL.

Specifically, after verifying that the user successfully logs in, the pushing server sends a second redirection request to a network portal corresponding to the URL according to the received network portal callback URL, and an authentication identifier and a user identifier are carried in the second redirection request, where the authentication identifier is used to request calling a subsequent interface server, and the interface server provides an interface used to execute data transmission, and exchanges data with the network portal through the interface. For example, the authentication identifier may be an interface token.

S306: The network portal creates a session for the user according to the received second redirection request sent by the pushing server, and saves the authentication identifier and the user identifier carried in the redirection request.

S307: The network portal obtains the network content selected by the user according to the interest point of the user, and the information set by the user for the mobile equipment according to the network content.

The user sets the selected network content as information of the attribute of the mobile equipment according to the interest point of the user.

For example, the user may set the selected network content as a wallpaper, a desktop or a ring tone of the mobile equipment.

It should be noted that, it is not limited to that step S307 is performed before step S308; the procedure that the user obtains the information of the attribute of the mobile equipment in step S307 and the procedure that the user selects a mobile equipment identifier in subsequent step S308 to step S311 are relatively independent procedures and have no absolute sequence, so step S307 only needs to be performed after step S306 and before step S312.

S308: The network portal sends a query request to the interface server.

The query request includes the user identifier and the authentication identifier.

S309: The interface server receives the query request sent by the network portal, and after verification on the authentication identifier is passed, it queries the user information storage server according to the user identifier, and obtains one or more mobile equipment identifiers corresponding to the user identifier.

A user identifier may bind a plurality of mobile equipments, so there may be a plurality of mobile equipment identifiers obtained according to the user identifier, where a mobile equipment identifier may be the identifier of a mobile equipment, the name of the mobile equipment, or the like.

Preferably, the embodiment of the present invention may further include step S310 as follows.

S310: After obtaining the one or more mobile equipment identifiers, the interface server queries an equipment information storage server according to the one or more mobile equipment identifiers, and obtains equipment configuration information corresponding to the one or more mobile equipments.

The equipment information storage server is configured to store equipment configuration information of a mobile equipment, and the equipment configuration information may be information such as the size or resolution of the screen of the mobile equipment or the multimedia supporting capability of the mobile equipment. For example, according to the configuration information of the resolution of the mobile equipment selected by the user, the network portal delivers a network content identifier suitable for the resolution to the selected mobile equipment, and an optimal display effect may be achieved.

S311: The interface server sends the obtained one or more mobile equipment identifiers to the network portal, so that the user selects a mobile equipment identifier.

Preferably, the interface server also sends the equipment configuration information obtained in S310 to the network portal, so that the network portal delivers a suitable network content identifier according to the equipment configuration information.

S312: After obtaining the mobile equipment identifier selected by the user according to the one or more mobile equipment identifiers, the network portal sends equipment execution information to the interface server, where the equipment execution information includes the identifier of the network content selected by the user, the selected mobile equipment identifier and setting information. The identifier of the network content and the setting information are the identifier of the selected network content and the setting information in S307. The identifier of the network content may be a download URL.

S313: The interface server sends the equipment execution information to the pushing proxy server.

After obtaining the equipment execution information sent by the network portal, the interface server sends the equipment execution information to the pushing proxy server, where the pushing proxy server is configured to push the information in the interface server to the mobile equipment.

S314: The pushing proxy server sends the identifier of the network content and the setting information in the equipment execution information to the corresponding mobile equipment according to the mobile equipment identifier in the equipment execution information.

S315: The mobile equipment obtains, from a network server according to the received identifier of the network content, the network content selected by the user, and sets the network content as the attribute of the mobile equipment according to the setting information received by the mobile equipment.

Preferably, the network content obtained by the mobile equipment from the network server may be network content conforming to the configuration of the mobile equipment, such as a picture conforming to a resolution, so that the mobile equipment can achieve a better attribute effect.

By adopting the method provided by the embodiment, the pushing proxy server pushes the identifier of the network content and the setting information to the mobile equipment, and in this way, even if the user carries no data line or the mobile equipment is not at hand, the user can still push the network content to the mobile equipment conveniently; in addition, the mobile equipment automatically sets the network content as the attribute of the mobile equipment according to the received setting information, thereby reducing manual setting operations of the user, and improving the user experience.

Figure 4:
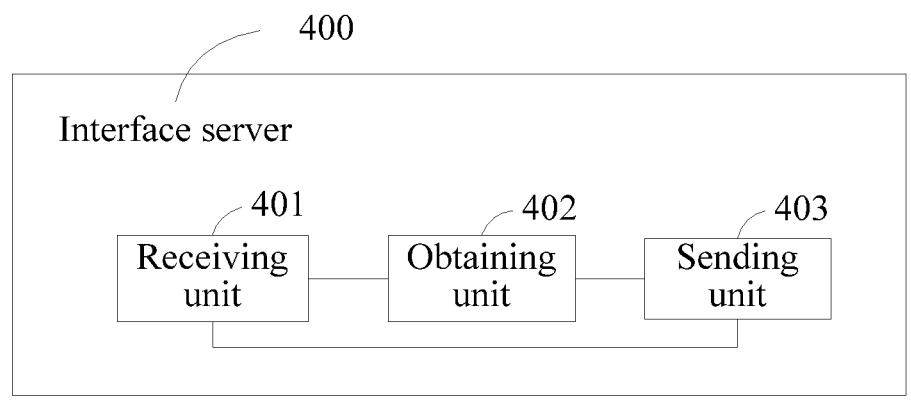
FIG. 4 is a schematic diagram of an interface server provided by an embodiment of the present invention.

FIG. 4 describes an interface server 400 provided by an embodiment of the present invention, including the following units.

A receiving unit 401 is configured to receive a query request sent by a network portal, where the query request includes a user identifier and an authentication identifier.

The authentication identifier is used to request calling the interface server, and the interface server provides an interface used to execute data transmission, and exchanges data with the network portal through the interface. For example, the authentication identifier may be an interface token.

An obtaining unit 402 is configured to, after verification on the authentication identifier received by the receiving unit 401 is passed, obtain one or more corresponding mobile equipment identifiers according to the user identifier received by the receiving unit 401.

Specifically, the obtaining unit 402 queries a user information storage server according to the user identifier received by the receiving unit 401, and obtains the one or more mobile equipment identifiers corresponding to the user identifier, where the interface server performs verification on the authentication identifier so as to determine the interface of the interface server called by the network portal, and determine that the interface is configured to execute data transmission.

A user identifier may bind a plurality of mobile equipments, so there may be a plurality of mobile equipment identifiers obtained according to the user identifier, where a mobile equipment identifier may be the identifier of a mobile equipment, the name of the mobile equipment, or the like.

A sending unit 403 is configured to send the one or more mobile equipment identifiers obtained by the obtaining unit 402 to the network portal, so that the network portal obtains a mobile equipment identifier selected by a user according to the one or more mobile equipment identifiers.

Specifically, the user selects a mobile equipment identifier according to one or more mobile equipment identifiers displayed by the network portal, and the selected mobile equipment identifier is the identifier of a mobile equipment to which the user requests pushing network content.

The receiving unit 401 is further configured to receive equipment execution information sent by the network portal, where the equipment execution information includes an identifier of network content, the selected mobile equipment identifier and setting information.

The identifier of the network content may specifically be a URL of the network content selected by the user on the network portal.

The setting information refers to execution information for setting the attribute of the mobile equipment, where if the attribute of the mobile equipment includes a wallpaper, a desktop or a ring tone, the corresponding setting information includes setting the wallpaper, the desktop or the ring tone of the mobile equipment. The setting information is execution information set by the user for the selected network content after the user selects the network content on the network portal according to the interest point of the user.

The sending unit 403 is further configured to send the equipment execution information received by the receiving unit 401 to a pushing proxy server, so that the pushing proxy server pushes the identifier of the network content and the setting information to a mobile equipment corresponding to the selected mobile equipment identifier, and the mobile equipment sets an attribute of the mobile equipment according to the identifier of the network content and the setting information.

Specifically, that the mobile equipment sets the attribute of the mobile equipment according to the identifier of the network content and the setting information includes that the mobile equipment obtains the network content from a network server according to the identifier of the network content such as a download URL, and sets the attribute of the mobile equipment according to the setting information.

In another embodiment of the present invention, the interface server 400 further includes the following units.

The obtaining unit 402 is further configured to obtain equipment configuration information corresponding to the one or more mobile equipment identifiers.

Specifically, after obtaining the one or more mobile equipment identifiers, the interface server obtains the equipment configuration information corresponding to the one or more mobile equipment identifiers by querying an equipment information storage server.

The equipment configuration information may be information such as the size or resolution of the screen of the mobile equipment or the multimedia supporting capability of the mobile equipment. For example, according to the configuration information of the resolution of the mobile equipment selected by the user, the network portal delivers a network content identifier suitable for the resolution to the selected mobile equipment, and an optimal display effect may be achieved.

The sending unit 403 is configured to send the equipment configuration information obtained by the obtaining unit 402 to the network portal, so that the network portal determines the identifier of the network content according to the equipment configuration information.

By adopting the interface server provided by the embodiment, even if the user carries no data line or the mobile equipment is not at hand, the user can still push the network content to the mobile equipment conveniently, and the mobile equipment automatically sets the network content as an attribute of the mobile equipment according to the received setting information, thereby reducing manual setting operations of the user, and improving the user experience.

Figure 5:
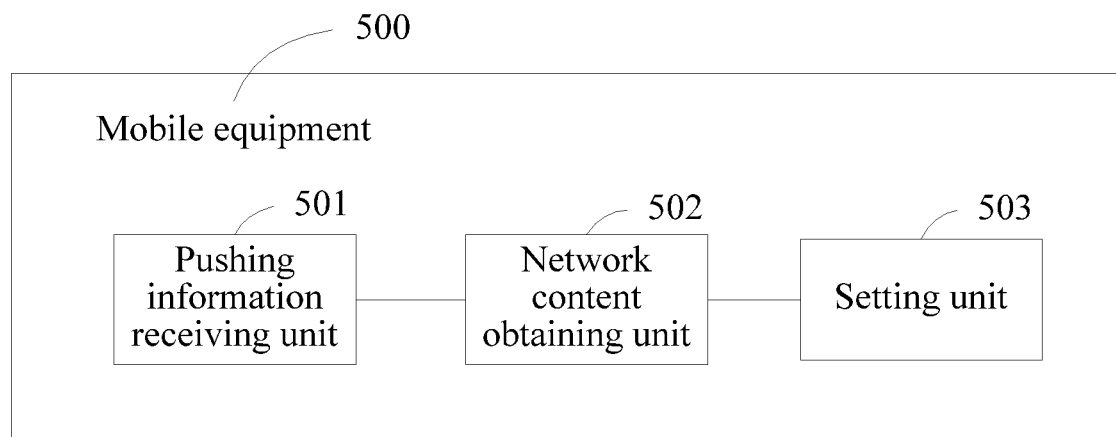
FIG. 5 is a schematic diagram of mobile equipment provided by an embodiment of the present invention.

FIG. 5 describes mobile equipment 500 provided by an embodiment of the present invention, specifically including the following units.

A pushing information receiving unit 501 is configured to receive pushing information sent by a pushing proxy server, where the pushing information includes an identifier of network content and setting information.

The identifier of the network content may specifically be a URL of the network content selected by a user on a network portal.

A network content obtaining unit 502 is configured to obtain corresponding network content according to the identifier of the network content received by the pushing information receiving unit 501.

Exemplarily, the network content is downloaded from a network server corresponding to the network portal according to the download URL of the network content.

A setting unit 503 is configured to set the network content as an attribute of the mobile equipment according to the setting information.

Specifically, the mobile equipment sets the network content as the attribute of the mobile equipment according to the received setting information after obtaining the network content. When the mobile equipment is in the setting procedure, the user is not required to execute a setting command, and the mobile equipment automatically completes a setting task according to the setting information. For example, the mobile equipment automatically sets the wallpaper (namely, network content) obtained from the network as the wallpaper of the mobile equipment according to the received setting information for setting the wallpaper, and the user is not required to perform any operation in the entire setting procedure.

Preferably, the network content obtained by the mobile equipment 500 from the network server may be network content conforming to the configuration of the mobile equipment, such as a picture conforming to a resolution, so that the mobile equipment can achieve a better attribute effect.

Specifically, the mobile equipment may be an equipment such as a mobile phone or a tablet computer.

By adopting the mobile equipment provided by the embodiment, even if the user carries no data line or the mobile equipment is not at hand, the user can still push the network content to the mobile equipment conveniently, and the mobile equipment automatically sets the network content as the attribute of the mobile equipment according to the received setting information, thereby reducing manual setting operations of the user, and improving the user experience.

Figure 6:
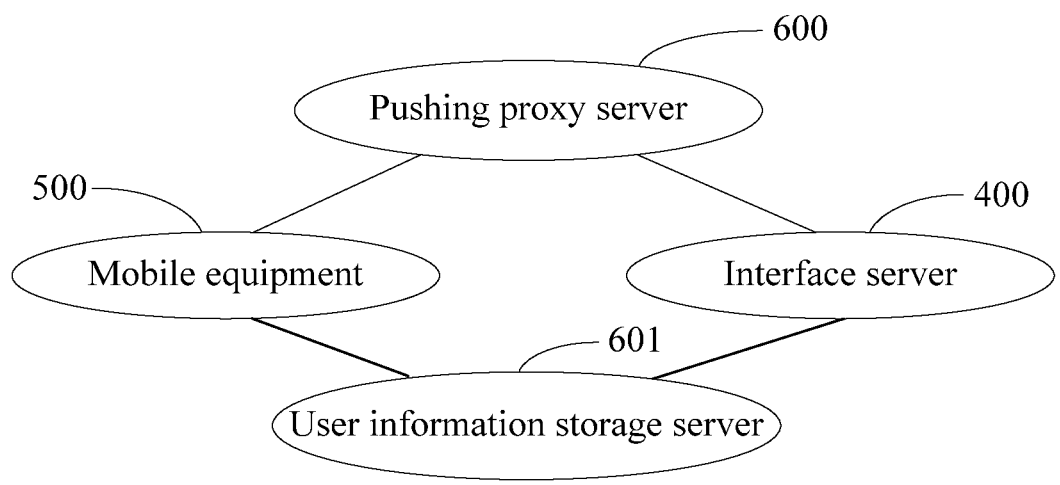
FIG. 6 is a schematic diagram of a system for pushing network content provided by an embodiment of the present invention.

FIG. 6 describes a system for pushing network content provided by an embodiment of the present invention, and the system includes the mobile equipment 500 in the above embodiment, the interface server 400 in the above embodiment, and a pushing proxy server 600.

The pushing proxy server 600 is configured to push an identifier of network content and setting information to the mobile equipment 500, so that the mobile equipment 500 sets an attribute of the mobile equipment according to the identifier of the network content and the setting information.

Further, in another embodiment of the present invention, the system further includes a user information storage server 601.

The user information storage server 601 is configured to receive a login request sent by the mobile equipment 500, where the login request carries the user identifier and the mobile equipment identifier; search for a user identifier, which is consistent with the user identifier in the login request, from user identifiers which are saved by the user information storage server and are successfully registered; and if it finds the user identifier successfully, save a binding relationship between the user identifier and the mobile equipment identifier.

Figure 7:
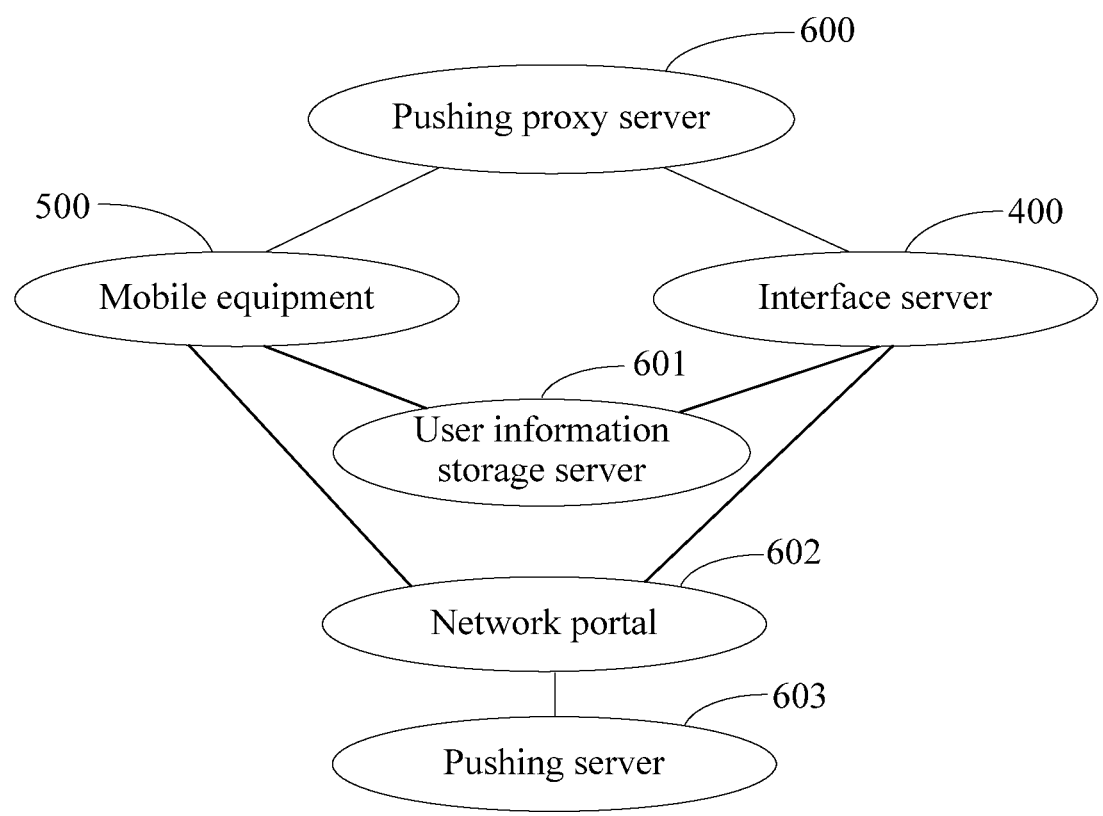
FIG. 7 is a schematic diagram of another system for pushing network content provided by an embodiment of the present invention.

Moreover, as shown in FIG. 7, the system further includes a network portal 602 and a pushing server 603.

The network portal 602 is configured to redirect to a login page of the pushing server 603 after it is confirmed that the pushing server 603 is in a log-off state, where first redirection request information sent by the network portal 602 to the pushing server 603 carries a network portal callback URL.

The pushing server 603 is configured to redirect to a page corresponding to the network portal callback URL after the network portal 602 confirms that the pushing server 603 is in a login state, where second redirection request information sent by the pushing server 603 to the network portal 602 carries the authentication identifier and the user identifier.

The non-login state refers to that a user does not successfully log in to the pushing server according to the user identifier; the login state refers to that the user successfully logs in to the pushing server according to the user identifier.

In addition, the network portal 602 is further configured to save the authentication identifier and the user identifier in the second redirection request information.

It should be noted that the mobile equipment and the interface server are applied to the method for pushing network content, and the units in the mobile equipment and the interface server are also corresponding to the steps in the method.

By adopting the system for pushing network content provided by the embodiment, the pushing proxy server pushes the identifier of the network content and the setting information to the mobile equipment, and even if the user carries no data line or the mobile equipment is not at hand, the user can still push the network content to the mobile equipment conveniently; in addition, the mobile equipment sets the network content as the attribute of the mobile equipment, thereby reducing manual setting operations of the user, and improving the user experience.

Through the description of the above implementation manners, persons skilled in the art may clearly understand that the present invention may be implemented with hardware, firmware, or a combination of the hardware and firmware. If implemented with software, the functions may be stored in a computer readable medium or may be used as one or more instructions or codes on a computer readable medium for transmission. The computer readable medium includes a computer storage medium and a communication medium, where the communication medium includes any medium for conveniently transferring a computer program from a place to another place. The storage medium may be any available medium that can be accessed by a computer. By way of example, and not limitation, the computer readable medium may include random-access memory (RAM), read-only memory (ROM), electrically erasable programmable read-only memory (EEPROM), compact disc read-only memory (CD-ROM) or other optical disk storage, magnetic disk storage or other magnetic storage equipment, or any other medium that can be used to carry or store desired program codes in the form of instructions or data structures and that can be accessed by a computer. Furthermore, any connection may appropriately be used as a computer readable medium. For example, if the software is transmitted from a website, server, or other remote source using a coaxial cable, fiber optic cable, twisted pair, digital subscriber line (DSL), or wireless technologies such as infrared, radio, and microwave, the coaxial cable, fiber optic cable, twisted pair, DSL, or wireless technologies such as infrared, radio, and microwave are included in the definition of the medium. Disk and disc, as used in the present invention, include a compact disc (CD), a laser disc, an optical disc, a digital versatile disc (DVD), a floppy disk and a Blu-ray® disc, where disks usually reproduce data magnetically, while discs reproduce data optically with lasers. The above combination should also be included in the protection scope of the computer readable medium.

The foregoing description is merely specific embodiments of the present invention, but is not intended to limit the protection scope of the present invention. Any variation or replacement readily figured out by persons skilled in the art within the technical scope disclosed in the present invention shall fall within the protection scope of the present invention. Therefore, the protection scope of the present invention is subject to the protection scope of the claims.

What is claimed is:

1. A method for pushing network content, comprising:
   receiving, by an interface server, a query request sent by a network portal, wherein the query request comprises a user identifier and an authentication identifier;
   obtaining, by the interface server, one or more corresponding mobile equipment identifiers according to the user identifier after verification on the authentication identifier is passed;
   sending, by the interface server, the one or more mobile equipment identifiers to the network portal such that the network portal obtains a mobile equipment identifier selected by a user according to the one or more mobile equipment identifiers;

receiving, by the interface server, equipment execution information sent by the network portal, wherein the equipment execution information comprises an identifier of network content, the selected mobile equipment identifier, and setting information; and sending, by the interface server, the equipment execution information to a pushing proxy server such that the pushing proxy server pushes the identifier of the network content and the setting information to a mobile equipment corresponding to the selected mobile equipment identifier, and the mobile equipment sets an attribute of the mobile equipment according to the identifier of the network content and the setting information.

2. The method according to claim 1, wherein before receiving the equipment execution information sent by the network portal, the method further comprises:

obtaining, by the interface server, equipment configuration information corresponding to the one or more mobile equipment identifiers; and sending, by the interface server, the equipment configuration information to the network portal such that the network portal determines the identifier of the network content according to the equipment configuration information.

3. The method according to claim 1, wherein the setting information comprises execution information for setting the attribute of the mobile equipment.

4. The method according to claim 1, wherein the authentication identifier is an interface token.

5. An interface server, comprising:

a receiver configured to receive a query request sent by a network portal, wherein the query request comprises a user identifier and an authentication identifier;

a processor configured to obtain one or more corresponding mobile equipment identifiers according to the user identifier after verification on the authentication identifier is passed;

a transmitter configured to send the one or more mobile equipment identifiers to the network portal such that the network portal obtains a mobile equipment identifier selected by a user according to the one or more mobile equipment identifiers, wherein the receiver is further configured to receive equipment execution information sent by the network portal, and the equipment execution information comprises an identifier of network content, the selected mobile equipment identifier, and setting information, and wherein the transmitter is further configured to send the equipment execution information to a pushing proxy server such that the pushing proxy server pushes the identifier of the network content and the setting information to a mobile equipment corresponding to the selected mobile equipment identifier, and the mobile equipment sets an attribute of the mobile equipment according to the identifier of the network content and the setting information.

6. The interface server according to claim 5, wherein the processor is further configured to obtain equipment configuration information corresponding to the one or more mobile equipment identifiers, and wherein the transmitter is further configured to send the equipment configuration information to the network portal such that the network portal determines the identifier of the network content according to the equipment configuration information.

7. A system for pushing network content, comprising:

a interface server comprising:

a receiver configured to receive a query request sent by a network portal, wherein the query request comprises a user identifier and an authentication identifier;

a processor configured to obtain one or more corresponding mobile equipment identifiers according to the user identifier after verification on the authentication identifier is passed;

a transmitter configured to send the one or more mobile equipment identifiers to the network portal such that the network portal obtains a mobile equipment identifier selected by a user according to the one or more mobile equipment identifiers, wherein the receiver is further configured to receive equipment execution information sent by the network portal, and the equipment execution information comprises an identifier of network content, the selected mobile equipment identifier, and setting information, and wherein the transmitter is further configured to send the equipment execution information to a pushing proxy server such that the pushing proxy server pushes the identifier of the network content and the setting information to a mobile equipment corresponding to the selected mobile equipment identifier, and the mobile equipment sets an attribute of the mobile equipment according to the identifier of the network content and the setting information, a mobile equipment comprising:

a pushing information receiver configured to receive pushing information sent by a pushing proxy server, wherein the pushing information comprises an identifier of network content and setting information;

a processor configured to:

obtain corresponding network content according to the identifier of the network content; and set the network content as an attribute of the mobile equipment according to the setting information, and a pushing proxy server configured to push an identifier of network content and setting information to the mobile equipment such that the mobile equipment sets an attribute of the mobile equipment according to the identifier of the network content and the setting information.

8. The system according to claim 7, further comprising a user information storage server, wherein the user information storage server is configured to:

receive a login request sent by the mobile equipment, wherein the login request carries the user identifier and the mobile equipment identifier;

search for a user identifier, which is consistent with the user identifier in the login request, from user identifiers which are saved by the user information storage server and are successfully registered; and save a binding relationship between the user identifier and the mobile equipment identifier when the user identifier is successfully found.

9. The system according to claim 7, further comprising a network portal and a pushing server, wherein the network portal is configured to redirect to a login page of the pushing server after it is confirmed that the pushing server is in a non-login state, wherein first redirection request information sent by the network portal to the pushing server carries a network portal callback uniform resource locator (URL), wherein the pushing server is configured to redirect to a page corresponding to the network portal callback URL after the network portal confirms that the pushing server is in a login state, wherein second redirection request information sent by the pushing server to the network portal carries the authentication identifier and the user identifier, and wherein the network portal is further configured to save the authentication identifier and the user identifier in the second redirection request information.

10. The system according to claim 7, wherein the authentication identifier is an interface token.

* * * * *